United States Patent
Goutay et al.

(10) Patent No.: US 11,617,183 B2
(45) Date of Patent: Mar. 28, 2023

(54) DEMAPPING RECEIVED DATA

(71) Applicant: NOKIA TECHNOLOGIES OY, Espoo (FI)

(72) Inventors: Mathieu Goutay, Paris (FR); Faycal Ait Aoudia, Saint-Cloud (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 44 days.

(21) Appl. No.: 17/539,661

(22) Filed: Dec. 1, 2021

(65) Prior Publication Data

US 2022/0183014 A1    Jun. 9, 2022

(30) Foreign Application Priority Data

Dec. 3, 2020   (FI) ..................... 20206249

(51) Int. Cl.
*H04W 72/08*    (2009.01)
*H04B 7/0452*   (2017.01)
*H04L 25/02*    (2006.01)

(52) U.S. Cl.
CPC ........ *H04W 72/082* (2013.01); *H04B 7/0452* (2013.01); *H04L 25/0222* (2013.01); *H04L 25/0254* (2013.01)

(58) Field of Classification Search
None
See application file for complete search history.

(56) References Cited

U.S. PATENT DOCUMENTS

| | | | |
|---|---|---|---|
| 10,826,581 B1 | 11/2020 | Noorzad et al. | |
| 2007/0016413 A1* | 1/2007 | Seo | H04L 5/0046 704/229 |
| 2010/0208718 A1* | 8/2010 | Yoshida | H04L 27/2657 370/343 |
| 2012/0140725 A1* | 6/2012 | Kawamura | H04L 27/2613 370/310 |
| 2017/0163319 A1 | 6/2017 | Chavali et al. | |
| 2018/0367192 A1* | 12/2018 | O'Shea | G06N 3/088 |
| 2019/0356516 A1* | 11/2019 | Cao | H04L 25/0256 |
| 2021/0110261 A1* | 4/2021 | Lee | H04L 5/0055 |
| 2021/0266203 A1* | 8/2021 | Yoo | H04L 25/03165 |
| 2021/0273707 A1* | 9/2021 | Yoo | H04L 1/0072 |
| 2021/0320825 A1* | 10/2021 | Banuli Nanje Gowda | H04L 25/0246 |

(Continued)

FOREIGN PATENT DOCUMENTS

| | | |
|---|---|---|
| CN | 109246038 A | 1/2019 |
| CN | 110289875 A | 9/2019 |

(Continued)

OTHER PUBLICATIONS

Office Action dated Mar. 8, 2021 corresponding to Finnish Patent Application No. 20206249.

(Continued)

*Primary Examiner* — Clemence S Han
(74) *Attorney, Agent, or Firm* — Squire Patton Boggs (US) LLP

(57) ABSTRACT

To provide demapping at a receiving side, a trained model for a demapper is used to output log-likelihood ratios of received signals representing data in a multi-user transmission. Inputs for the trained model for the demapper comprise a resource grid of equalized received signals.

8 Claims, 5 Drawing Sheets

(56) References Cited

U.S. PATENT DOCUMENTS

| | | | |
|---|---|---|---|
| 2021/0376895 A1* | 12/2021 | Xue | H04L 1/1854 |
| 2022/0014398 A1* | 1/2022 | Andrews | G06N 3/08 |

FOREIGN PATENT DOCUMENTS

| | | | |
|---|---|---|---|
| KR | 20170093752 A | 8/2017 | |
| WO | WO 2020/104036 A1 | 5/2020 | |
| WO | 2020/142059 A1 | 7/2020 | |

OTHER PUBLICATIONS

Finnish Search Report dated Mar. 8, 2021 corresponding to Finnish Patent Application No. 20206249.

Communication of Acceptance—section 29a of Patents Decree dated Nov. 3, 2021 corresponding to Finnish Patent Application No. 20206249.

Extended European Search Report corresponding to EP Application No. 21210957.3, dated Apr. 19, 2022.

Ori Shental et al., ""Machine LLRning": Learning to Softly Demodulate", 2019 IEEE Globecom Workshops (GC WKSHPS), IEEE, Dec. 9, 2019, XP033735086, 7 pages.

Mikko Honkala et al., "DeepRx: Fully Convolutional Deep Learning Receiver", Arxiv.org, Cornell University Library, 201 Olin Library Cornell University Ithaca, NY 14853, May 4, 2020, XP081658750, 30 pages.

Qi Li et al., "Soft Decision Signal Detection of MIMO System Based on Deep Neural Network", 2020 5th International Conference on Computer and Communication Systems (ICCCS), IEEE, May 15, 2020, XP033781980, pp. 665-669.

Yuxin Lu et al., "Deep Multi-Task Learning for Cooperative NOMA: System Design and Principles", IEEE Journal on Selected Areas in Communications, IEEE Service Center, Piscataway, US, vol. 39, No. 1, Nov. 9, 2020, XP011826364, pp. 61-78.

Chinese Office Action corresponding to CN Application No. 202111465571.9, dated Nov. 15, 2022.

* cited by examiner

DEMAPPING RECEIVED DATA

TECHNICAL FIELD

Various example embodiments relate to wireless communications and, particularly, to demapping of received transmissions.

BACKGROUND

Wireless communication systems are under constant development. For example, in multiple input-multiple output (MIMO) wireless communication systems data may be simultaneously encoded on adjacent subcarriers.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising at least one processor; and at least one memory including computer program code, the at least one memory and computer program code configured to, with the at least one processor, cause the apparatus at least to perform: estimating a channel over which data is received in a multi-user transmission; equalizing received signals, which are two-dimensional representations of received data; inputting to a trained model for a demapper a resource grid of equalized received signals, wherein the trained model is configured to process in two dimensions the resource grid; and receiving log-likelihood ratios of the received signals as output of the trained model for the demapper.

In an embodiment, the at least one memory and computer program code are configured to, with the at least one processor, cause the apparatus further to perform: inputting to the trained model for the demapper also a resource grid of estimated noise variances of a post equalization channel.

In an embodiment, the at least one memory and computer program code are configured to, with the at least one processor, cause the apparatus further to perform: inputting to the trained model for the demapper also position information on resource elements of the received signals.

In an embodiment, the position information includes spectral position and temporal position.

In an embodiment, the at least one memory and computer program code are configured to, with the at least one processor, cause the apparatus further to perform: inputting to the trained model for the demapper also additional information comprising at least one of an estimation of the channel, channel noise variances or number of users.

In an embodiment, the at least one memory and computer program code configured to, with the at least one processor, cause the apparatus further to perform: using a plurality of trained models for a demapper, a trained model for a demapper per a transmitting apparatus or stream, wherein the plurality of trained models for a demapper are different entities of one trained model.

According to an aspect there is provided a comprising at least one first apparatus and a plurality of second apparatuses; wherein a first apparatus is configured to support multi-user multiple input-multiple output transmissions, and comprises at least a set of antennas, at least one processor and at least one memory including computer program code, the at least one memory and computer program code configured to, with the at least one processor, cause the apparatus at least to perform transmitting data to two or more of the plurality of second apparatuses over a channel in a multi-user transmission; wherein a second apparatus comprises at least one processor; and at least one memory including computer program code, the at least one memory and computer program code configured to, with the at least one processor, cause the second apparatus at least to perform, when the multi-user transmission comprises data targeted to the second apparatus: estimating the channel over which the data targeted to the second apparatus is received; equalizing received signals, the signals being two-dimensional representations of received data targeted to the second apparatus; inputting to a trained model for a demapper a resource grid of equalized received signals, wherein the trained model is configured to process in two dimensions the resource grid and is a copy of a corresponding trained model for a demapper shared by the plurality of second apparatuses; and receiving log-likelihood ratios of the received signals as output of the trained model for the demapper.

In an embodiment, the at least one memory and computer program code configured to, with the at least one processor, cause the first apparatus further to perform, when data from two or more second apparatuses is received in a multi-user transmission: estimating a channel over which the data is received; equalizing received signals, a signal being two-dimensional representation of received data from a second apparatus; using a plurality of second trained models for a demapper, a second trained model for a demapper per a transmitting second apparatus or stream, wherein the plurality of second trained models for a demapper are different entities of one second trained model configured to process in two dimensions the resource grid; inputting, per a transmitting second apparatus or stream, to a corresponding second trained model for a demapper, a resource grid of equalized received signals corresponding data received from the transmitting second apparatus or data belonging to the stream; and receiving log-likelihood ratios of the received signals as outputs of the second trained models for the demapper.

According to an aspect there is provided an apparatus comprising at least one processor; and at least one memory including computer program code, the at least one memory and computer program code configured to, with the at least one processor, cause the apparatus at least to perform: acquiring a model modeling at least a channel estimator, an equalizer and a demapper, wherein at least the demapper is modeled using an algorithm with trainable parameters, the algorithm processing in two dimensions data that is input in the two dimensions; initializing trainable parameters for the algorithm; generating a batch of signals representing received data in two dimensions to be used as training data; performing a forward pass through the model to the training data; updating the trainable parameters by applying one step of a stochastic gradient descent on a loss function; training the trainable parameters by repeating the generating, performing the forward pass, evaluating and updating until a stop criterion is fulfilled; stopping the training when the stop criterion is fulfilled; and storing, after stopping the training, a trained model for the demapper.

In an embodiment, the model comprises a plurality of demappers, modeled to have same trainable parameters per a demapper.

According to an aspect there is provided a method for an apparatus, the method, when performed by the apparatus, comprising: receiving a multi-user transmission comprising data targeted to the apparatus and at least data targeted a second apparatus; estimating a channel over which the data targeted to the apparatus is received; equalizing received signals, which are two-dimensional representations of received data targeted to the apparatus; inputting to a trained model for a demapper a resource grid of equalized received signals, wherein the trained model is configured to process in two dimensions the resource grid and being a copy of a corresponding trained model for a demapper in the second apparatus; and receiving log-likelihood ratios of the received signals as output of the trained model for the demapper.

According to an aspect there is provided a method for an apparatus, the method, when performed by the apparatus, comprising: receiving a multi-user transmission comprising at least data transmitted from a second apparatus and data transmitted from a third apparatus; estimating a channel over which the multi-user transmission is received; equalizing received signals, which are two-dimensional representations of received data at least from the second apparatus and from the third apparatus; inputting at least to a first entity of a trained model for a demapper a first resource grid of equalized received signals representing data from the second apparatus, and at least to a second entity of the trained model for a demapper a second resource grid of equalized received signals representing data from the third apparatus, wherein the first entity and the second entity are different entities of the trained model for a demapper configured to process in two dimensions resource grids; and receiving log-likelihood ratios of the received signals as outputs of the entities of the trained model for the demapper.

According to an aspect there is provided a method comprising: acquiring a model modeling at least a channel estimator, an equalizer and a demapper, wherein at least the demapper is modeled using an algorithm with trainable parameters, the algorithm processing in two dimensions data that is input in the two dimensions; initializing trainable parameters for the algorithm; generating a batch of signals representing received data in two dimensions to be used as training data; performing a forward pass through the model to the training data; updating the trainable parameters by applying one step of a stochastic gradient descent on a loss function; training the trainable parameters by repeating the generating, performing the forward pass, and updating until a stop criterion is fulfilled; stopping the training when the stop criterion is fulfilled; and storing, after stopping the training, a trained model for the demapper.

According to an aspect there is provided a computer program comprising instructions which, when the program is executed by an apparatus, cause the apparatus to carry out at least: estimating, in response to receiving a multi-user transmission, which comprises data targeted to the apparatus and at least data targeted to a second apparatus, a channel over which the data targeted to the apparatus is received; equalizing received signals, which are two-dimensional representations of received data targeted to the apparatus; inputting to a trained model for a demapper a resource grid of equalized received signals, wherein the trained model is configured to process in two dimensions the resource grid and being a copy of a corresponding trained model for a demapper in the second apparatus; and receiving log-likelihood ratios of the received signals as output of the trained model for the demapper.

According to an aspect there is provided a computer program comprising instructions which, when the program is executed by an apparatus, cause the apparatus to carry out at least: estimating, in response to receiving a multi-user transmission comprising at least data transmitted from a second apparatus and data transmitted from a third apparatus, a channel over which the multi-user transmission is received; equalizing received signals, which are two-dimensional representations of received data at least from the second apparatus and from the third apparatus; inputting at least to a first entity of a second trained model for a demapper a first resource grid of equalized received signals representing data from the second apparatus, and at least to a second entity of the second trained model for a demapper a second resource grid of equalized received signals representing data from the third apparatus, wherein the first entity and the second entity are different entities of the second trained model for a demapper configured to process in two dimensions resource grids; and receiving log-likelihood ratios of the received signals as outputs of the entities of the trained model for the demapper.

According to an aspect there is provided a computer program comprising instructions which, when the program is executed by an apparatus, cause the apparatus to carry out at least: acquiring a model modeling at least a channel estimator, an equalizer and a demapper, wherein at least the demapper is modeled using an algorithm with trainable parameters, the algorithm processing in two dimensions data that is input in the two dimensions; initializing trainable parameters for the algorithm; generating a batch of signals representing received data in two dimensions to be used as training data; performing a forward pass through the model to the training data; updating the trainable parameters by applying one step of a stochastic gradient descent on a loss function; training the trainable parameters by repeating the generating, performing the forward pass, and updating until a stop criterion is fulfilled; stopping the training when the stop criterion is fulfilled; and storing, after stopping the training, a trained model for the demapper.

According to an aspect there is provided a computer-readable medium comprising program instructions, which, when run by an apparatus, causes the apparatus to to carry out at least: estimating, in response to receiving a multi-user transmission, which comprises data targeted to the apparatus and at least data targeted to a second apparatus, a channel over which the data targeted to the apparatus is received; equalizing received signals, which are two-dimensional representations of received data targeted to the apparatus; inputting to a trained model for a demapper a resource grid of equalized received signals, wherein the trained model is configured to process in two dimensions the resource grid and being a copy of a corresponding trained model for a demapper in the second apparatus; and receiving log-likelihood ratios of the received signals as output of the trained model for the demapper.

According to an aspect there is provided a computer-readable medium comprising program instructions, which, when run by an apparatus, causes the apparatus to carry out at least: estimating, in response to receiving a multi-user transmission comprising at least data transmitted from a second apparatus and data transmitted from a third apparatus, a channel over which the multi-user transmission is received; equalizing received signals, which are two-dimensional representations of received data at least from the second apparatus and from the third apparatus; inputting at least to a first entity of a second trained model for a demapper a first resource grid of equalized received signals representing data from the second apparatus, and at least to a second entity of the second trained model for a demapper a second resource grid of equalized received signals representing data from the third apparatus, wherein the first entity and the second entity are different entities of the second trained model for a demapper configured to process in two dimensions resource grids; and receiving log-likelihood ratios of the received signals as outputs of the entities of the trained model for the demapper.

According to an aspect there is provided a computer-readable medium comprising program instructions, which, when run by an apparatus, causes the apparatus to carry out at least: acquiring a model modeling at least a channel estimator, an equalizer and a demapper, wherein at least the demapper is modeled using an algorithm with trainable parameters, the algorithm processing in two dimensions data that is input in the two dimensions; initializing trainable parameters for the algorithm; generating a batch of signals representing received data in two dimensions to be used as training data; performing a forward pass through the model to the training data; updating the trainable parameters by applying one step of a stochastic gradient descent on a loss function; training the trainable parameters by repeating the generating, performing the forward pass, and updating until a stop criterion is fulfilled; stopping the training when the stop criterion is fulfilled; and storing, after stopping the training, a trained model for the demapper.

According to an aspect there is provided a non-tangible computer-readable medium comprising program instructions, which, when run by an apparatus, causes the apparatus to carry out at least: estimating, in response to receiving a multi-user transmission, which comprises data targeted to the apparatus and at least data targeted to a second apparatus, a channel over which the data targeted to the apparatus is received; equalizing received signals, which are two-dimensional representations of received data targeted to the apparatus; inputting to a trained model for a demapper a resource grid of equalized received signals, wherein the trained model is configured to process in two dimensions the resource grid and being a copy of a corresponding trained model for a demapper in the second apparatus; and receiving log-likelihood ratios of the received signals as output of the trained model for the demapper.

According to an aspect there is provided a non-tangible computer-readable medium comprising program instructions, which, when run by an apparatus, causes the apparatus to carry out at least: estimating, in response to receiving a multi-user transmission comprising at least data transmitted from a second apparatus and data transmitted from a third apparatus, a channel over which the multi-user transmission is received; equalizing received signals, which are two-dimensional representations of received data at least from the second apparatus and from the third apparatus; inputting at least to a first entity of a second trained model for a demapper a first resource grid of equalized received signals representing data from the second apparatus, and at least to a second entity of the second trained model for a demapper a second resource grid of equalized received signals representing data from the third apparatus, wherein the first entity and the second entity are different entities of the second trained model for a demapper configured to process in two dimensions resource grids; and receiving log-likelihood ratios of the received signals as outputs of the entities of the trained model for the demapper.

According to an aspect there is provided a non-tangible computer-readable medium comprising program instructions, which, when run by an apparatus, causes the apparatus to carry out at least: acquiring a model modeling at least a channel estimator, an equalizer and a demapper, wherein at least the demapper is modeled using an algorithm with trainable parameters, the algorithm processing in two dimensions data that is input in the two dimensions; initializing trainable parameters for the algorithm; generating a batch of signals representing received data in two dimensions to be used as training data; performing a forward pass through the model to the training data; updating the trainable parameters by applying one step of a stochastic gradient descent on a loss function; training the trainable parameters by repeating the generating, performing the forward pass, and updating until a stop criterion is fulfilled; stopping the training when the stop criterion is fulfilled; and storing, after stopping the training, a trained model for the demapper.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
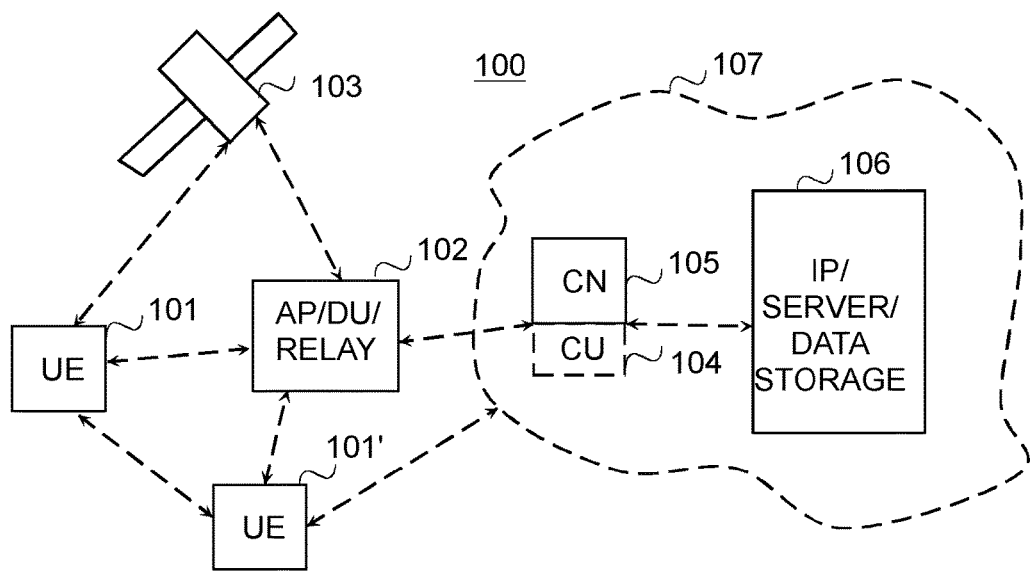
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5 G radio interface access comes from small cells by aggregation to the LTE. In other words, 5 G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5 G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network.

The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
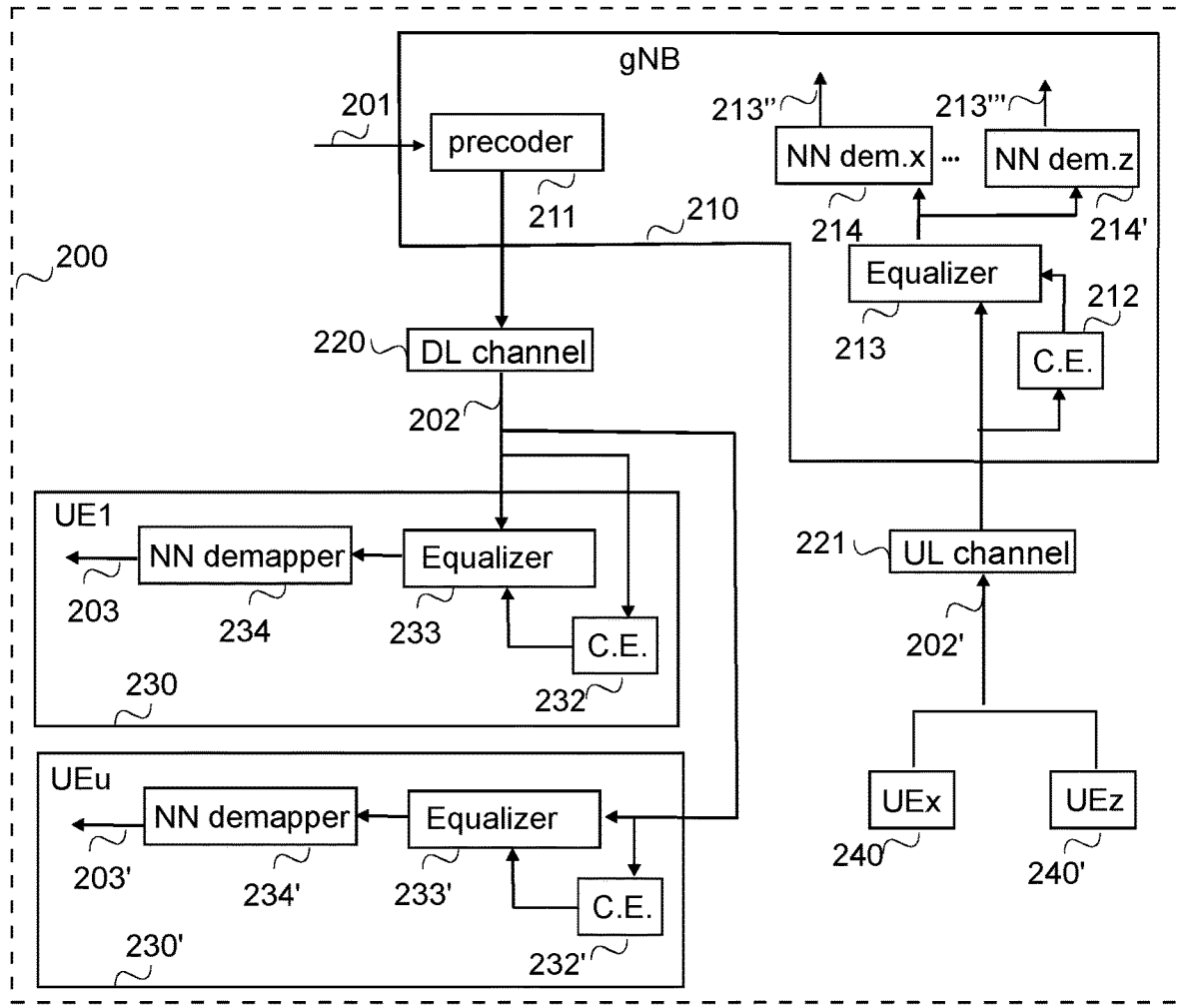
FIG. 2 illustrates an example of downlink and uplink architecture in a wireless network.

FIG. 2 illustrates an extremely general example of downlink and uplink architecture in a wireless network. It should be appreciated that the architecture is a very high level representation, only illustrating some elements, equipments and functional entities, which are logical units whose implementation may differ from what is shown. It is apparent to a person skilled in the art that the wireless network comprises any number of shown elements, other equipment, and structures that are not illustrated. Further, even though a logical unit is depicted as one entity, its physical implementation in hardware may be a distributed solution comprising several pieces of hardware.

In the illustrated example, the wireless network 200 comprises one or more base stations 210 or gNBs (only one illustrated in FIG. 2), a base station 210 representing an access node or corresponding apparatus serving one or more user apparatuses 230, 230', 240, 240'.

In the illustrated example, the base station 210 is configured to support multiple input-multiple output (MIMO) and comprises therefore a plurality of antennas (not illustrated separately), whereas the user apparatuses 230, 230', 240, 240' comprise one antenna, for the sake of description clarity. It should be appreciated that any or all of the user apparatuses may also comprise more than one antenna.

In the illustrated example, any known or future components may be used for transmitting data over a channel 220, 221, whereas for receiving data transmitted over the channel 220, 221 one or more receiver circuitries may be replaced by one or more trained models. In the illustrated example, demapper circuitry has been replaced by a neural network (NN) based trained model 214, 214', 234, 234' for the demapper. An example of such a trained model is described with FIG. 3.

More precisely, illustrated components of the base station 210 in FIG. 2 include a precoder component 211, shortly precoder, for precoding data to be transmitted, a channel estimator 212 for estimating a channel 221 over which data is received, an equalizer 213 for equalizing received signals and trained models 214, 214" for the demapper (NN dem., neural network based trained model for the demapper), in the illustrated example a trained model for the demapper per a user apparatus 240, 240' transmitting data, or per a stream (spatial stream) of transmitted data. Having separate trained models 214, 214' for the demapper provides easy adaptation to a variable number of streams and/or transmitting user apparatuses 240, 240'. The separate trained models 214, 214' for the demapper share the weights (trained parameter values). In other words, there is a trained model from which as many entities are created (and assigned) as there are uplink streams/user apparatuses transmitting.

Further, illustrated components of user apparatuses 230, 230', 240, 240' include components for receiving signals, the components illustrated being a channel estimator 232, 232' for estimating a channel 220 over which data is received, an equalizer 223, 223' for equalizing received signals and trained models 234, 234" for the demapper (NN demapper, neural network based trained model for the demapper). The trained models 234, 234' in different user apparatuses share the same set of trainable parameters with the same trained values. In other words, one may say the trained models 234, 234' are copies of a trained model for a demapper, which is trained for downlink.

Data 201 to be transmitted using downlink is precoded by a precoder 211 in the base station 210 and transmitted over the downlink channel 220 in a multi-user transmission, and a user apparatus 230, 230' receives from the combined transmitted signals 202 signals targeted to the user apparatus. The user apparatus 230, 230' is configured to process the signals by one or more channel estimators (C.E.) 232, 232' and by one or more equalizers 233, 233', output of the one or more channel estimators 232, 232' being input to the one or more equalizers 233, 233'. The one or more equalizers 233, 233', and the one or more channel estimators, 232, 232' are configured to extract from the combined transmitted signals those signals that are targeted to the user apparatus 230, 230'.

The output of the one or more equalizers 233, 233', i.e. equalized received signals, is inputted to the trained model for the demapper 234, 234'. The trained model for the demapper 234, 234' output log-likelihood ratios (LLRs) 203, 203' on the transmitted bits. The log-likelihood ratios 203 can be subsequently input to a channel decoder (not illustrated in FIG. 2) to reconstruct the bits transmitted to the user apparatus.

Data to be transmitted using uplink is transmitted from one or more user apparatuses 240, 204' over an uplink channel 221 in a multi-user transmission in signals 202'. The base station 210 is configured to process the signals by one or more channel estimators (C.E.) 212 and by one or more equalizers 213, output of the one or more channel estimators 212 being input to the one or more equalizers 213. The one or more channel estimators 212 and the one or more equalizers 213 are configured to perform a linear multiple input-multiple output (MIMO) detection, using for example a linear minimum mean square error (LMMSE) algorithm resulting to user apparatus/stream-specific equalized signals that are input to a corresponding trained model for the demapper 214, 214'. The trained model for the demapper 214, 214' output log-likelihood ratios (LLRs) 203", 203"' on the transmitted bits. The log-likelihood ratios 203", 203"' can be subsequently input to a channel decoder (not illustrated in FIG. 2) to reconstruct the bits transmitted from the user apparatus.

It should be appreciated that the same user apparatus may be a receiving user apparatus and a transmitting user apparatus. Further, it should be appreciated that usually the transmissions over the channel 220, 230 are one-dimensional transmission, for example using time domain only, and in such cases the receiving apparatus is configured to convert a transmission to a two-dimensional grid, for example to a grid having a time domain and frequency domain explained below with FIG. 3.

Even though in the example of FIG. 2, the trained model for the demapper is used for downlink and for uplink, it should be appreciated that in other implementations there may be user apparatuses not comprising a trained model for the demapper, and/or there may be base stations not comprising a trained model for the demapper, and implementations in which the trained model for the demapper may be used for downlink only or for uplink only.

Figure 3:
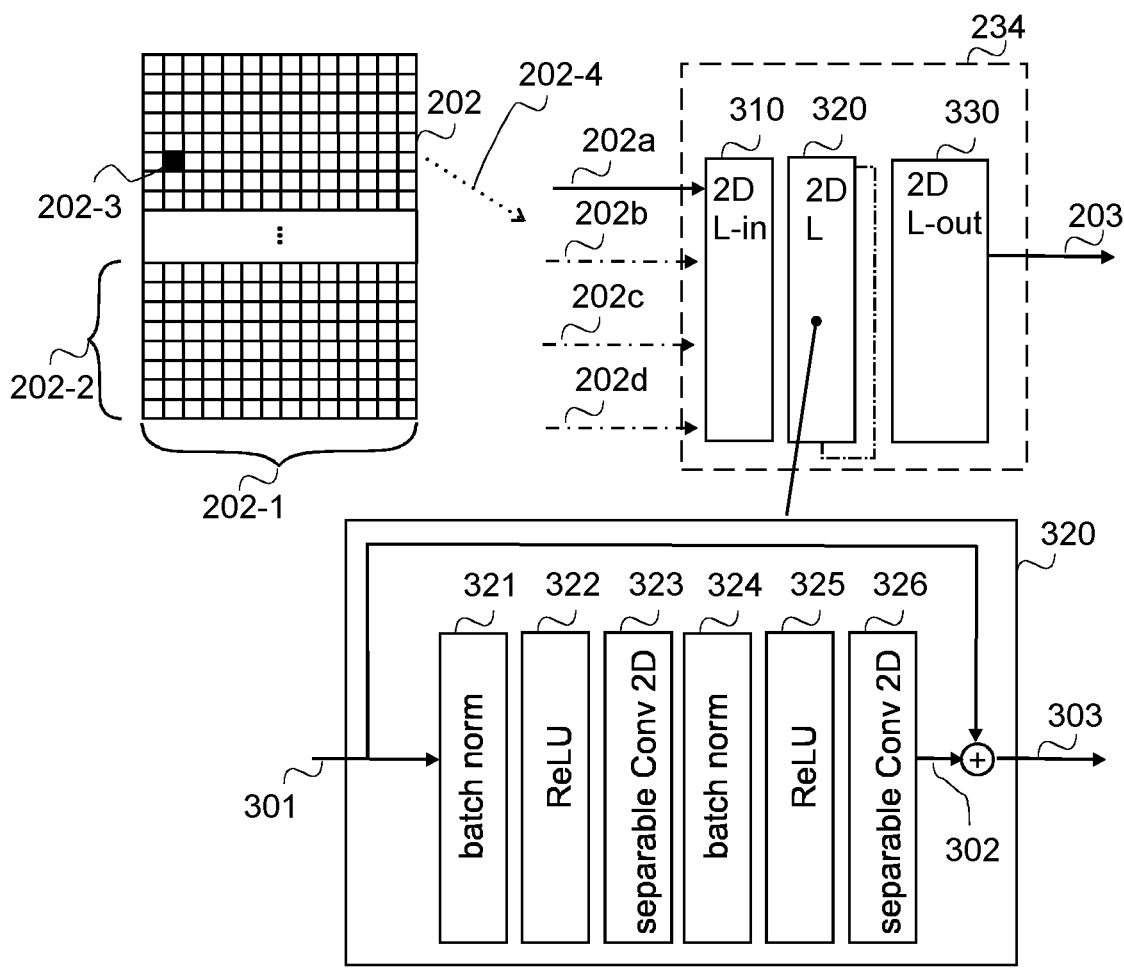
FIG. 3 illustrates an example of a model for a demapper.

FIG. 3 illustrates an example of a model for a neural network based demapper and its inputs. Below the explanations are made using downlink transmissions, but applying the same to uplink transmission is straightforward. In the illustrated example it is assumed that a transmitting apparatus, for example a base station, comprises $N_m$ antennas, and that there are $N_u$ receiving apparatuses, for example user apparatuses.

Referring to FIG. 3, the transmission 202 transmitted over the downlink channel is, or is transformed (converted) to, a resource grid formed by resource elements 202-3, wherein transmitted signals are allocated to the resource elements 202-3, defined by a frequency f and a time t. In a multiple user MIMO system data to/from multiple user apparatuses may be transmitted simultaneously on the same resource element. The resource grid may be divided into multiple resource blocks 202-2 and to a multiple slots 202-1. A resource block 202-2 comprises a certain number of sub-carriers and a slot 202-1 comprises a certain number of symbols. For example in a system using orthogonal frequency division multiplexing (OFDM) a resource block comprises 12 subcarriers (a subcarrier is one row in the resource grid) and a slot 14 OFDM symbols (a symbol is one column in the resource grid).

On the transmitting side, for each resource element 202-3 defined by a time t and frequency f, a vector of modulated baseband signals $S_{f,t}$ of dimension $N_u$ is precoded and transmitted over the downlink channel. A receiving apparatus denoted by u receives a scalar signal $r_{f,t,u}$ 202-4 targeted to the user apparatus. The scalar signal may be seen as a result of desired signal plus interferences plus noise.

From the signal 202-4 one or more inputs to the trained model 234 for the demapper are determined, as will be described in more detail below. Inputs for the model comprises at least equalized signals 202a of a resource grid (a sub-resource grid). The resource grid (sub-resource grid) may comprise multiple resource blocks 202-2 and one slot 202-1, for example. It should be appreciated that the term "resource grid" used herein covers both the entire time-frequency grid over which signal transmission is possible as well as sub-resource grids, which are small time-frequency grids that contain resource elements allocated to user apparatuses transmitting and/or receiving. Inputs for the model 234 may further comprise an estimated variance 202b of a post equalization channel of the resource grid (sub-resource grid) and/or position information 202c on the position of resource elements, and/or other additional information 202d, which may comprise the number of receiving user apparatuses $N_u$ and/or channel noise variances and/or estimation of the channel, etc. The position information 202c and/or the other additional information 202d may be input to improve the accuracy of outputted log-likelihood ratios 203.

Since the input(s) to the trained model 234 for the demapper is(are) two-dimensional, the trained model 234 is based on two-dimensional neural network(s). In the illustrated example, the trained model is based on two-dimensional residual convolutional neural network. More precisely, in the illustrated example the trained model 234 for the demapper comprises a two-dimensional input layer 310, one or more two-dimensional layers 320 that are blocks based on a residual neural network and a two-dimensional output layer 330. The input layer 310 and the output layer 330 may be two-dimensional convolutional neural network layers. The one or more blocks based on a residual neural network may comprise, per a block 320, six two-dimensional layers (sub-layers). The layers (sub-layers) may be a batch normalization layer 321 (batch norm), a rectifier linear unit (ReLu) 322, a separable two-dimensional convolutional layer 323, another batch normalization layer 324 (batch norm), another rectifier linear unit (ReLu) 325, and another separable two-dimensional convolutional layer 326. In other words, in the illustrated residual neural network, the input 301 to the block 320 is fed (input) to a first batch normalization 321 sublayer, its output is fed to a first rectifier liner unit 322, its output is fed to a first one-dimension convolutional layer 323, its output is fed to a second batch normalization 324 sublayer, its output is fed to a second rectifier liner unit 325, its output is fed to a second one-dimension convolutional layer 326. The output 302 from the second one-dimension convolutional layer 326 is combined with the input 301 to the block, and the combination result is the output 303 of the block 320. The separable two-dimensional convolutional layers 323 and 326 act on inputs 202, 202b, optionally 202c, optionally 202d, separately thereby decreasing required memory resources and computational capacity and complexity without incurring significant loss of performance. It may be that a trained model for the demapper comprising one block 320 will provide better demapping functionality than demapping algorithms currently in use.

It should be appreciated that the architecture of the trained model illustrated in FIG. 3 is only an example, and any other architecture configured to process signals in two-dimensions may be used.

Figure 4:
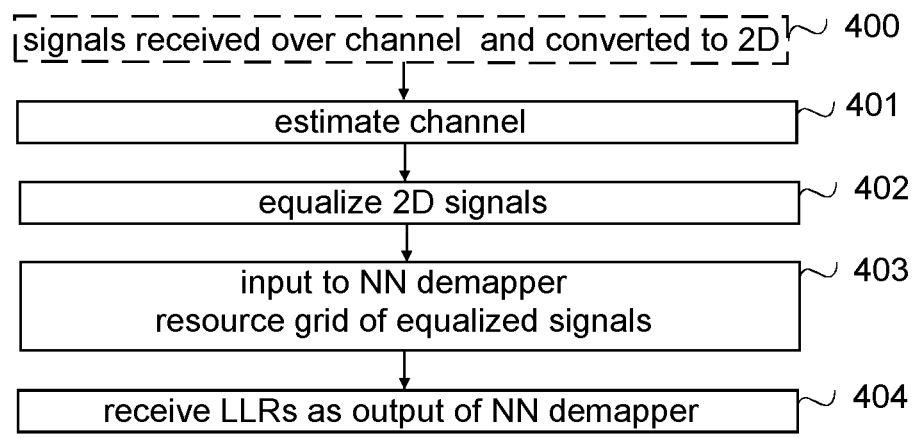
FIGS. 4 to 6 illustrate example functionalities relating deployment of trained model for the demapper.
Figure 5:
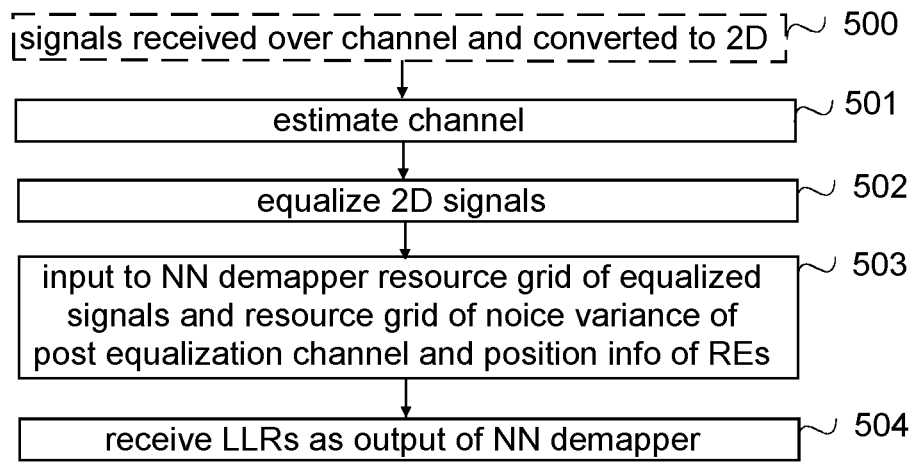
Figure 6:
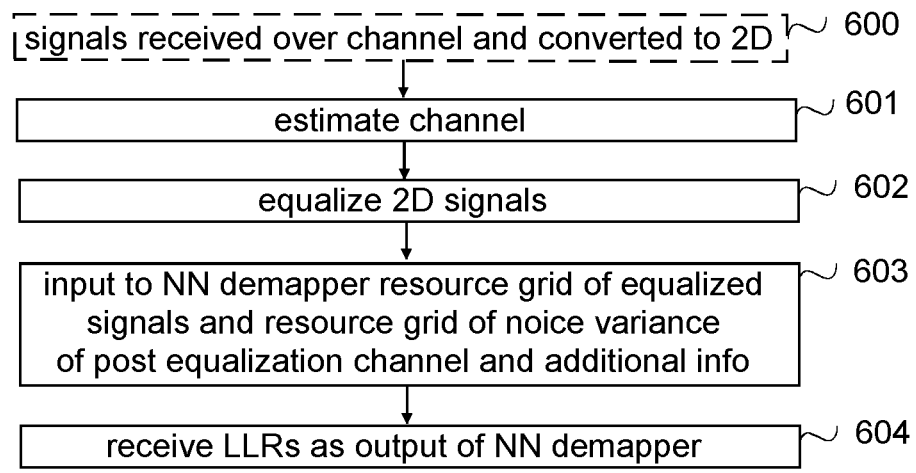

FIGS. 4 to 6 illustrates different examples of functionalities of a receiving apparatus comprising a trained model for a demapper. In the examples below it is assumed, for the sake of description, that orthogonal frequency division multiplexing (OFDM) is used, data is transmitted over the channel as one dimensional data (data in time domain) and converted (transformed), for example using Fast Fourier transformation algorithm, to two-dimensional received data without limiting the solutions to such system. The solutions may be implemented with any system in which a representation of a received signal is two-dimensional (e.g. time domain and frequency domain) or transformable to be two-dimensional if the signal is transmitted over the channel in one dimension (for example in the time domain).

Referring to FIG. 4, a data is received in block 400 over a channel and converted to a two-dimensional signal, For example the receiving apparatus, denoted by u receives a scalar signal $r_{f,t,u}$ corresponding to a time t and frequency f. (It should be appreciated that the originally received signal may comprise a plurality of scalar signals corresponding to the time t and frequency f that are targeted to other user apparatuses.) The receiving apparatus estimates in block 401 the channel and equalizes in block 402 received signals to get an estimate of transmitted signals, resulting that the actual channel is transformed into an additive noise channel, known as a post equalization channel. The transfer function is following:

$$\hat{s}_{f,t,u} = s_{f,t,u} + z_{f,t,u}, \forall f \in \mathcal{F}, t \in \mathcal{T}$$

wherein $\hat{s}_{f,t,u}$=estimate of a transmitted signal to u at time t and frequency f (equalized received signal)

$\hat{s}_{f,t,u}$=received signal to u at time t and frequency f $z_{f,t,u}$=additive noise channel (post equalization channel)

$\mathcal{F}$ =set $\{1, \ldots N_f\}$ $N_f$=number of subcarriers $\mathcal{T}$ =set $\{1, \ldots N_t\}$ $N_t$=number of orthogonal frequency division multiplexing symbols The result of blocks 401 and 402, i.e. at least a resource grid of equalized signals, is input in block 403 to the trained model for the demapper (NN demapper). More precisely, the input is at least:

$$\hat{s}_{f,t,u} \; \forall f \in \mathcal{F}, t \in \mathcal{T}$$

Log-likelihood ratios (LLRs) are received in block 404 as outputs of the trained model for the demapper (NN demapper), to be further processed, for example as inputs to a channel decoder to reconstruct the bits transmitted to the user apparatus.

In another implementation also a resource grid of noise variance of a post equalization channel (additive noise channel), obtainable as a result of block 401 and 402, are input in block 403 to the trained model for the demapper (NN demapper). More precisely, in the implementation the inputs are:

$$\hat{s}_{f,t,u} \; \forall f \in \mathcal{F}, t \in \mathcal{T}$$

$$\tau_{f,t,u}^2 \; \forall f \in \mathcal{F}, t \in \mathcal{T}$$

The variance may be estimated using following, when it is assumed that mean of the additive noise channel is zero and Hermitian transpose (conjugate transpose) of A is denoted as $A^H$:

$$\tau_{f,t,u}^2 = \frac{\mathbb{E}[\|\tilde{g}_{f,t,u}\|_2^2] + \hat{g}_{f,t,-u}^H \hat{g}_{f,t,-u} + \mathbb{E}[\tilde{g}_{f,t,-u}^H \tilde{g}_{f,t,-u}] + \sigma_{f,t}^2}{\|\tilde{g}_{f,t,u}\|_2^2}$$

wherein $\tau_{f,t,u}^2$=variance of post equalization channel to u at time t and frequency f $\tilde{g}_{f,t,u}$=estimation error of channel intended to u at time t and frequency f $\hat{g}_{f,t,-u}$=estimated channels intended to other user apparatus than u at time t and frequency f $\tilde{g}_{f,t,-u}$=estimation errors of channels intended to other user apparatus than u at time t and frequency f $\sigma_{f,t}^2$=variance of a complex Gaussian noise vector per time t and frequency f $\hat{g}_{f,t,u}$=estimated channel intended to u at time t and frequency f As can be seen from the above, computing the variance $\tau_{f,t,u}$ requires knowledge of the estimation error statistics. However, accurate statistics of channels are not usually available, and the estimation error statistics are usually approximates obtained using offline experiments or simulations. The trained model for the demapper is trained with inaccurate values so it can better absorb the inaccuracy than demapper algorithms assuming correct statistics. In other words, the trained model for the demapper and use of estimations to calculate inputs takes into account channel aging (even within a slot) caused by mobility, and the fact that a channel is usually not perfectly known and can be estimated at a receiving side.

FIG. 5 illustrates another implementation. In the example implementation of FIG. 5, the position of a resource element within the resource grid is used as an input. Hence, in the example it is taken into account that the noise distribution depends on the position. For example, an amount of noise in resource elements may depend on how they are positioned in respect to a resource element carrying a pilot signal (the nearer, the smaller amount of noise).

Referring to 5, blocks 500 to 502 corresponds to blocks 400 to 402 and are not repeated in vain herein.

The results of blocks 501 and 502, i.e. a resource grid of equalized signals and a resource grid of noise variance of a post equalization channel, and position information are input in block 503 to the trained model for the demapper (NN demapper). The position information can be input in various ways, for example by inputting two position inputs: a spectral position and a temporal position. For example, the inputs may be following:

$$\hat{s}_{f,t,u} \; \forall f \in \mathcal{F}, t \in \mathcal{T}$$

$$\tau_{f,t,u}^2 \; \forall f \in \mathcal{F}, t \in \mathcal{T}$$

$$A_f \in \mathbb{R}^{N_f \times N_t} = \begin{bmatrix} 1 & \cdots & 1 \\ \vdots & \ddots & \vdots \\ N_f & \cdots & N_f \end{bmatrix}$$

$$A_t \in \mathbb{R}^{N_f \times N_t} = \begin{bmatrix} 1 & \cdots & N_t \\ \vdots & \ddots & \vdots \\ 1 & \cdots & N_t \end{bmatrix}$$

wherein
$A_f$=spectral position
$A_t$=temporal position
$N_f$=number of subcarriers
$N_t$=number of orthogonal frequency division multiplexing symbols Log-likelihood ratios (LLRs) are received in block 504 as outputs of the trained model for the demapper (NN demapper), to be further processed, for example as inputs to a channel decoder to reconstruct the bits transmitted to the user apparatus.

FIG. 6 illustrates a further implementation to the solution disclosed with FIG. 4. In the example implementation of FIG. 6, additional information (other than position information) is used to increase accuracy of the trained model for the demapper.

Referring to 6, blocks 600 to 602 corresponds to blocks 400 to 402 and are not repeated in vain herein.

The results of blocks 601 and 602, i.e. a resource grid of equalized signals, a resource grid of noise variance of a post equalization channel, and additional information are input in block 603 to the trained model for the demapper (NN demapper). The additional information may comprise one or more inputs, such as the number of user apparatuses/streams $N_u$ and/or channel noise variances $\sigma_{f,t}^2$ and/or estimation of the channel $\hat{g}_{f,t,u}$. Log-likelihood ratios (LLRs) are received in block 604 as outputs of the trained model for the demapper (NN demapper), to be further processed, for example as inputs to a channel decoder to reconstruct the bits transmitted to the user apparatus.

In a further implementation, inputs to the trained model for the demapper comprise a resource grid of equalized signals, a resource grid of noise variance of a post equalization channel, position information and additional information.

As can be seen from the above examples, a receiver architecture may be maintained without other changes than using as a demapper the trained model for the demapper. For example, no changes are required to channel estimators and to equalizers. Use of the trained model for the demapper results to reduction of bit error rate (BER), which may increase throughput and decrease latency while preserving the flexibility of current receiver architectures, such as easy adaptation to a varying number of user apparatuses.

Figure 7:
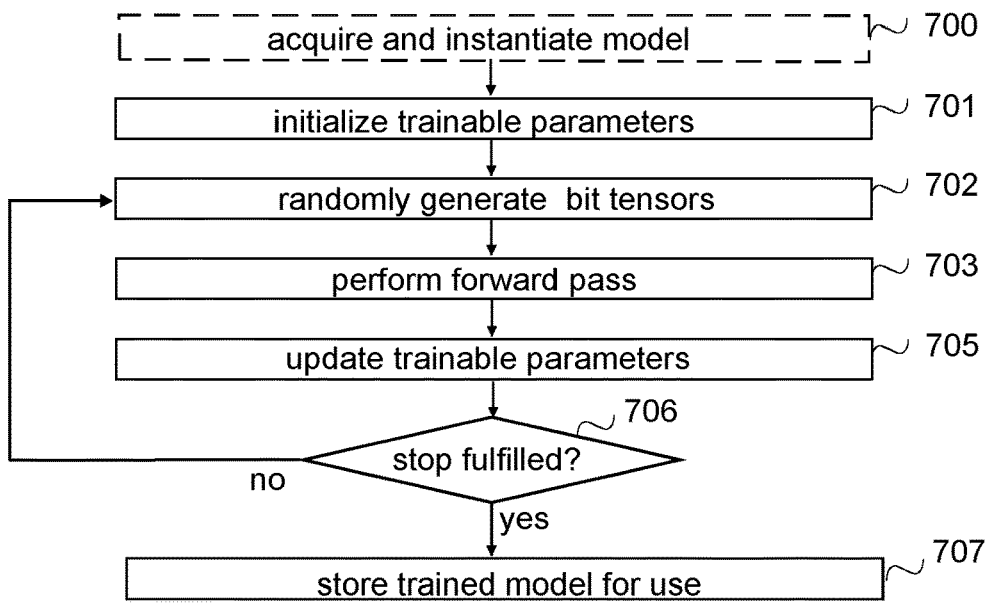
FIG. 7 illustrates an example of a training functionality.

FIG. 7 illustrates a training functionality of an apparatus configured to train the algorithm with trainable parameters for the demapper (i.e. a trainable demapper). In the illustrated example it is assumed that the trainable demapper model, for example the one illustrated in 3, is trained in an end-to-end manner for downlink, using non-trainable models of a channel estimator and equalizer and, at a transmitting side, a precoder to reproduce its inputs at its outputs. Such a model may be trained without pre-existing training data set, by generating random bits at the transmitting side and using the generated bits as the training and validation data. However, it should be appreciated that the training may be performed without the channel model and the precoder model. For example, when a pre-existing training data set, which comprises sent bits, corresponding received signals and channel noise variance, exist, the training can be performed without the channel model and the precoder model. Furthermore, the model may use a trainable model of the channel estimator and/or a trainable model of the equalizer. Training for uplink is performed in the same way, assuming multiple transmitting user apparatuses, and corresponding number of demapper entities (algorithms) with trainable parameters, the demapper entities having the same set of trainable parameters. It should be appreciated that the trainable parameters for uplink may be different from trainable parameters for downlink.

A further assumption made, for the clarity of description, in the example of FIG. 7 is that all user apparatuses transmit (send) or receive the same number of bits per a channel use. The number of bits per channel use depends on modulation order of the transmission. For example, with Quadrature Phase Shift Keying (QPSK) the number of bits per a channel use is 2, and with 16 Quadrature Amplitude Modulation (16QAM) the number of bits per a channel use is 4. However, it is a straightforward procedure to implement the example training to train using data in which the number of bits per a channel use vary from stream to stream (from user apparatus to user apparatus).

Referring to FIG. 7, the model, or more precisely its definitions, is acquired and instantiated in block 700 in response to the training being triggered. Then trainable parameters θ for the demapper are initialised in block 701. For example, random values may be used to initialise the trainable parameters. Then a batch of training data, which in the example is a batch of bit tensors, is generated in block 702. For example, $B_s$ bit tensors ($B^{(1)}$, $B^{(2)}$, . . . , $B^{(B_s)}$), where $B_s$ is the batch size, a tensor $B^{(s)}$ being of dimension $N_f \times N_t \times N_u \times M$, where M is the number of bits intended to the user apparatus u, may be generated (randomly or by randomly selecting from a pre-existing training data set) in block 702.

The forward pass through the acquired model, using the $B_s$ bit tensors as input, is performed in block 703 and the trainable parameters θ are updated in block 704 by applying one step of stochastic gradient descent on the loss (loss function). For example, following loss function may be used:

$$L(\theta) = -\frac{1}{B_s}\sum_{s=1}^{B_s}\sum_{(f,t)\in\mathcal{D}}\sum_{u=1}^{N_u}\sum_{m=1}^{M}\left(B^{(s)}_{f,t,u,m}\log(P^{(s)}_{f,t,u,m}) + (1-B^{(s)}_{f,t,u,m})\log(P^{(s)}_{f,t,u,m})\right)$$

wherein

L(θ)=loss $\mathcal{D}$=set of resource elements carrying data $B_s$=batch size $N_u$=number of users M=number of bits intended to the user apparatus u per a channel use $B_{f,t,u,m_{(s)}}$)=$m^{th}$ bit sent by the $u^{th}$ user over the $f^{th}$ subcarrier and $t^{th}$ OFDM symbol in the $s^{th}$ bit tensor $P_{f,t,u,m}^{(s)}$=estimated probability that the $m^{th}$ bit sent by the $u^{th}$ user over the $f^{th}$ subcarrier and $t^{th}$ OFDM symbol is set to one for the $s^{th}$ tensor (training example), calculated by taking the sigmoid of outputs in block 703 (i.e. the log likelihood ratios)

Then it is checked in block 705, whether stop criteria (end criteria) are fulfilled (end criteria met). If the stop criteria is not fulfilled (block 705: no), the process returns to block 702 to randomly generate new $B_s$ bit tensors.

When the model is determined to be accurate enough, i.e. the stop criteria are fulfilled (block 705: yes), the trained model is stored in block 707, and could be copied to a plurality of apparatuses, and/or copied within apparatuses, that are configured to receive data over one or more wireless channels, using channel estimators and equalizers having similar characteristics, to be used when data is received.

In other words, the neural network model is trained in an iterative manner until the models fulfil stop criteria (accuracy criteria). The stop criteria may be that a predefined number of iterations has been performed and/or the value of the loss function, has not decreased during a predefined number of consecutive iterations, or a decrease of the value has been under a threshold during a predefined number of consecutive iterations and/or the value is below a threshold. The training may be supervised learning or semi-supervised learning and during the iterations weights of nodes in the neural network based model may be adjusted.

The blocks, related functions, and information exchanges described above by means of FIGS. 2 to 7 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information.

Figure 8:
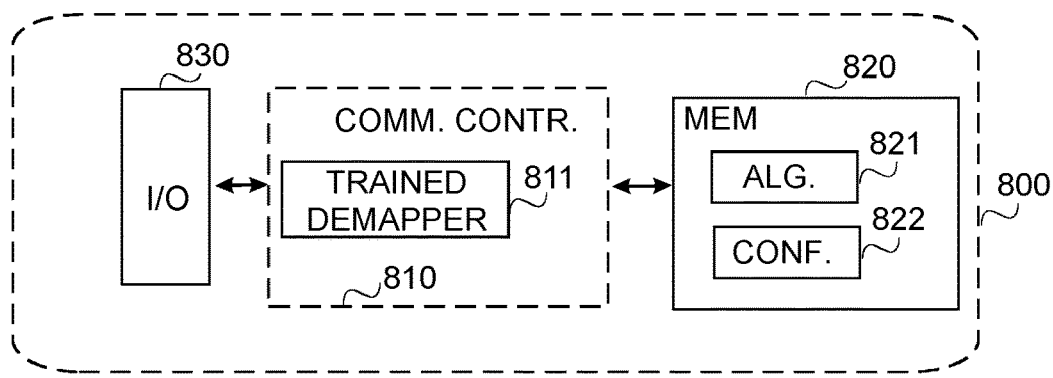
FIGS. 8 and 9 are schematic block diagrams.
Figure 9:
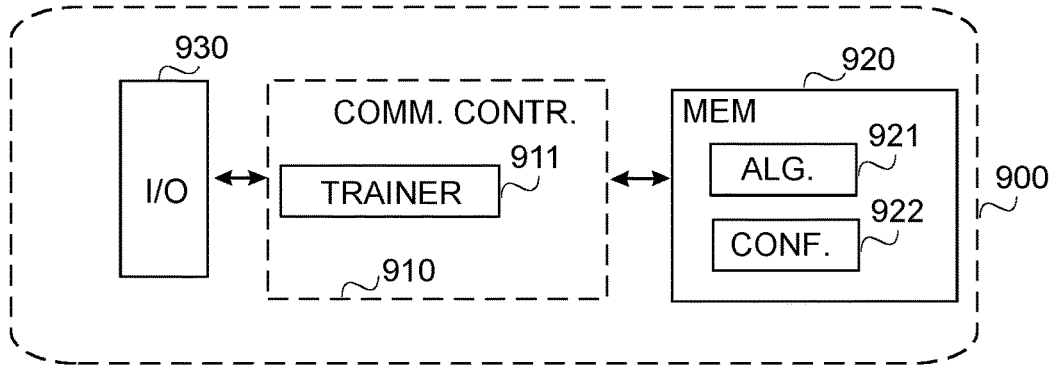

FIGS. 8 and 9 illustrate apparatuses comprising a communication controller 810, 910 such as at least one processor or processing circuitry, and at least one memory 820, 920 including a computer program code (software, algorithm) ALG. 821, 921, wherein the at least one memory and the computer program code (software, algorithm) are configured, with the at least one processor, to cause the respective apparatus to carry out any one of the embodiments, examples and implementations described above. FIG. 8 illustrates an apparatus comprising one or more trained models for a demapper, and FIG. 9 illustrates an apparatus for training the one or more models. Naturally, the apparatuses may be merged, i.e. model(s) trained and trained model(s) used in the same apparatus. The apparatuses of FIGS. 8 and 9 may be electronic devices.

Referring to FIGS. 8 and 9, the memory 820, 920 may be implemented using any suitable data storage technology, such as semiconductor based memory devices, flash memory, magnetic memory devices and systems, optical memory devices and systems, fixed memory and removable memory. The memory may comprise a configuration storage CONF. 821, 921, such as a configuration database, for at least storing one or more configurations and/or corresponding parameters/parameter values, for example the one or more trained models/trained model entities, i.e. parameters with values and model architecture, and/or training data and information to create models for training. The memory 820, 920 may further store a data buffer for data waiting for transmission and/or data waiting to be decoded.

Referring to FIG. 8, the apparatus 800 may further comprise a communication interface 830 comprising hardware and/or software for realizing communication connectivity at least according to one or more radio communication protocols. The communication interface 830 may provide the apparatus with radio communication capabilities with one or more base stations (access nodes) of a wireless network, or with radio communication capabilities with one or more user equipment served by the apparatus. The communication interface may comprise standard well-known analog radio components such as an amplifier, filter, frequency-converter and circuitries, conversion circuitries transforming signals between analog and digital domains, and one or more antennas. Digital signal processing regarding transmission and/or reception of signals may be performed in a communication controller 810, using in the reception the above disclosed trained models, for example.

The apparatus 800 may further comprise an application processor (not illustrated in FIG. 8) executing one or more computer program applications that generate a need to transmit and/or receive data The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. If the apparatus is an access node, the application processor may execute access applications. In an embodiment, at least some of the functionalities of the apparatus of FIG. 8 may be shared between two physically separate devices, forming one operational entity. Therefore, the apparatus may be seen to depict the operational entity comprising one or more physically separate devices for executing at least some of the processes described with respect to the access node (base station).

The communication controller 810 may comprise one or more trained models (TRAINED DEMAPPER) 811 configured to perform demapping according to any one of the embodiments/examples/implementations described above.

Referring to FIG. 9, the apparatus for the training comprises a communication interface 930 comprising hardware and/or software for realizing communication connectivity according to one or more communication protocols. The communication interface 930 may provide the apparatus with communication capabilities to apparatuses comprising the trained one or more models. The communication interface may comprise standard well-known components such as an amplifier, filter, frequency-converter, (de)modulator, and encoder/decoder circuitries and one or more antennas.

The communication controller 910 comprises a trainer circuitry TRAINER 911 configured to train one or more trainable functions for demapping according to any one of the embodiments/examples/implementations described above.

In an embodiment, at least some of the functionalities of the apparatus of FIG. 9 may be shared between two physically separate devices, forming one operational entity. Therefore, the apparatus may be seen to depict the operational entity comprising one or more physically separate devices for executing at least some of the processes described with respect to the training apparatus.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform (carry out) at least some of the functionalities according to any one of the embodiments/examples/implementations of FIGS. 2 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Figure 10:
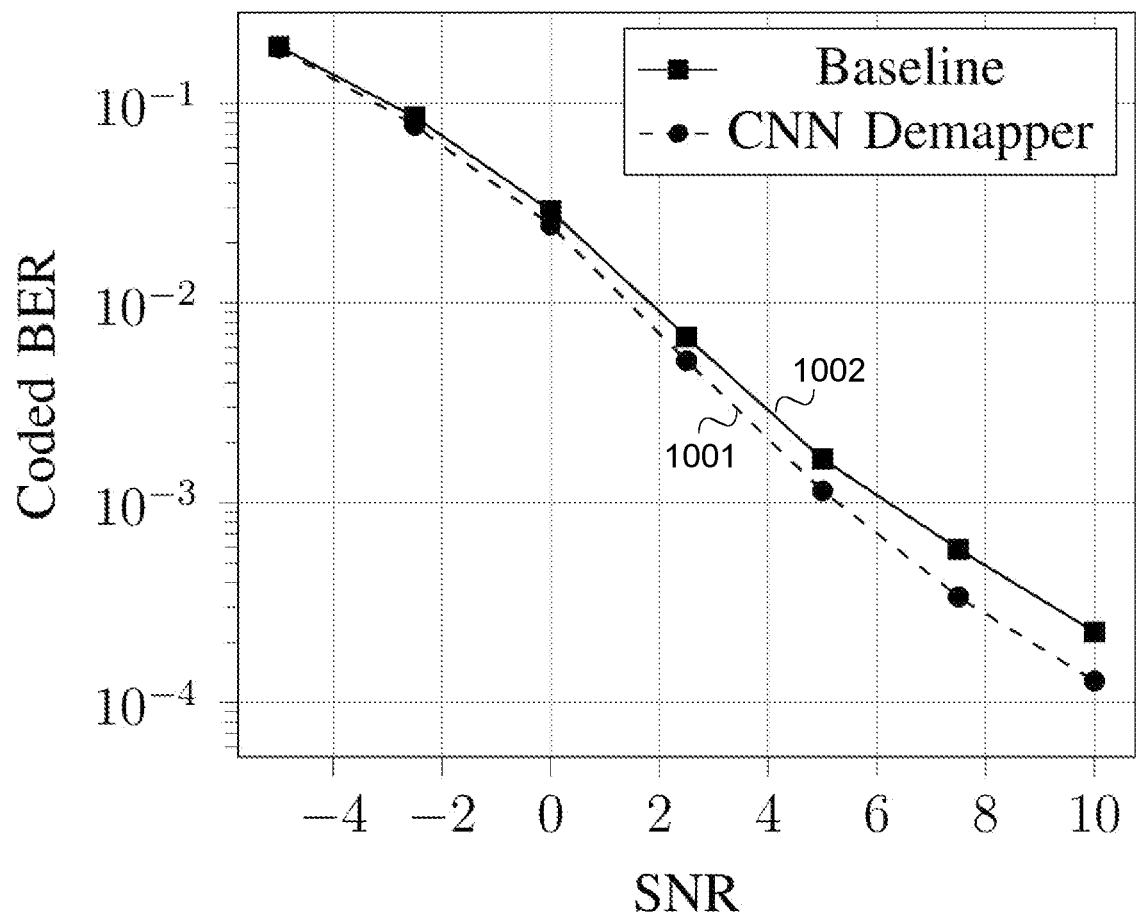
FIG. 10 shows a simulation result of a comparative example.

FIG. 10 shows a simulation result of a comparative example for uplink. The simulation used the same dataset, assuming 4 single antenna user apparatuses, 16 antennas at the base station, and 16QAM modulation.

Referring to FIG. 10, a relation of obtained bit error rate (BER) in logarithm scale as a function of signal-to-noise ratio SNR is shown in FIG. 10 for a convolutional neural network-based trained model for a demapper (CNN-based demapper) 1001 and for a demapper circuitry (Baseline) 1002. As can be seen from FIG. 10, the trained model for a demapper performs significantly better than the demapper circuitry (conventional demapper without trained model).

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including computer program code, the at least one memory and computer program code configured to, with the at least one processor, cause the apparatus at least to perform:
   estimating a channel over which data is received in a multi-user transmission;
   equalizing received signals, which are two-dimensional representations of received data;
   inputting to a trained model for a demapper a resource grid of equalized received signals, wherein the trained model is configured to process in two dimensions the resource grid; and
   receiving log-likelihood ratios of the received signals as output of the trained model for the demapper, wherein the at least one memory and computer program code are configured to, with the at least one processor, cause the apparatus to further perform:
   inputting to the trained model for the demapper additional information comprising a number of users,
   wherein the at least one memory and computer program code are configured to, with the at least one processor, cause the apparatus further to perform: using a plurality of trained models for a demapper, a trained model for a demapper per a spatial stream, wherein the plurality of trained models for a demapper are different entities of one trained model.

2. The apparatus according to claim 1, wherein the at least one memory and computer program code are configured to, with the at least one processor, cause the apparatus further to perform:
   inputting to the trained model for the demapper also a resource grid of estimated noise variances of a post equalization channel.

3. The apparatus according to claim 1, wherein the at least one memory and computer program code are configured to, with the at least one processor, cause the apparatus further to perform:
   inputting to the trained model for the demapper also position information on resource elements of the received signals.

4. The apparatus according to claim 3, wherein the position information includes spectral position and temporal position.

5. A system comprising at least one first apparatus and a plurality of second apparatuses;
   wherein a first apparatus is configured to support multi-user multiple input-multiple output transmissions, and comprises at least a set of antennas, at least one first processor and at least one first memory including first computer program code, the at least one first memory and first computer program code configured to, with the at least one first processor, cause the apparatus at least to perform transmitting data to two or more of the plurality of second apparatuses over a channel in a multi-user transmission;
   wherein a second apparatus of the plurality of second apparatuses comprises at least one second processor; and at least one second memory including second computer program code, the at least one second memory and second computer program code configured to, with the at least one second processor, cause the second apparatus at least to perform, when the multi-user transmission comprises data targeted to the second apparatus:
   estimating the channel over which the data targeted to the second apparatus is received;
   equalizing received signals, the signals being two-dimensional representations of received data targeted to the second apparatus;
   inputting to a trained model for a demapper a resource grid of equalized received signals, wherein the trained model is configured to process in two dimensions the resource grid and is a copy of a corresponding trained model for a demapper shared by the plurality of second apparatuses; and
   receiving log-likelihood ratios of the received signals as output of the trained model for the demapper, the at least one second memory and second computer program code configured to, with the at least one second processor, cause the second apparatus at least to further perform, when the multi-user transmission comprises data targeted to the second apparatus:
   inputting to the trained model for the demapper additional information comprising a number of users,
   wherein the at least one second memory and second computer program code are configured to, with the at least one second processor, cause the second apparatus further to perform: using a plurality of trained models for a demapper, a trained model for a demapper per a spatial stream, wherein the plurality of trained models for a demapper are different entities of one trained model.

6. The system as claimed in claim 5, wherein the at least one first memory and first computer program code are configured to, with the at least one first processor, cause the first apparatus further to perform, when data from two or more second apparatuses is received in a multi-user transmission:
   estimating a channel over which the data is received;
   equalizing received signals, a signal being two-dimensional representation of received data from a second apparatus;
   using a plurality of second trained models for a demapper, a second trained model for a demapper per a transmitting second apparatus or stream, wherein the plurality of second trained models for a demapper are different entities of one second trained model configured to process in two dimensions the resource grid;
   inputting, per a transmitting second apparatus or stream, to a corresponding second trained model for a demapper, a resource grid of equalized received signals corresponding data received from the transmitting second apparatus or data belonging to the stream; and
   receiving log-likelihood ratios of the received signals as outputs of the second trained models for the demapper.

7. A method for a first apparatus, the method, when performed by the first apparatus, comprising:

receiving a multi-user transmission comprising data targeted to the first apparatus and at least data targeted a second apparatus;

estimating a channel over which the data targeted to the first apparatus is received;

equalizing received signals, which are two-dimensional representations of received data targeted to the first apparatus;

inputting to a trained model for a demapper a resource grid of equalized received signals, wherein the trained model is configured to process in two dimensions the resource grid and being a copy of a corresponding trained model for a demapper in the second apparatus; and receiving log-likelihood ratios of the received signals as output of the trained model for the demapper, the method further comprising:

inputting to the trained model for the demapper additional information comprising a number of users, the method further comprising:

using a plurality of trained models for a demapper, a trained model for a demapper per a spatial stream, wherein the plurality of trained models for a demapper are different entities of one trained model.

8. A method for a first apparatus, the method, when performed by the first apparatus, comprising:

receiving a multi-user transmission comprising at least data transmitted from a second apparatus and data transmitted from a third apparatus;

estimating a channel over which the multi-user transmission is received;

equalizing received signals, which are two-dimensional representations of received data at least from the second apparatus and from the third apparatus;

inputting at least to a first entity of a trained model for a demapper a first resource grid of equalized received signals representing data from the second apparatus, and at least to a second entity of the trained model for a demapper a second resource grid of equalized received signals representing data from the third apparatus, wherein the first entity and the second entity are different entities of the trained model for a demapper configured to process in two dimensions resource grids; and receiving log-likelihood ratios of the received signals as outputs of the entities of the trained model for the demapper, the method further comprising:

inputting to the trained model for the demapper additional information comprising a number of users, the method further comprising:

using a plurality of trained models for a demapper, a trained model for a demapper per a spatial stream, wherein the plurality of trained models for a demapper are different entities of one trained model.

* * * * *